March 30, 1948. C. B. LINN ET AL 2,438,565
METHOD OF PURIFYING A HYDROCARBON MATERIAL CONTAINING A RELATIVELY
SMALL AMOUNT OF AN ORGANIC FLUORINE COMPOUND
Filed Oct. 26, 1945
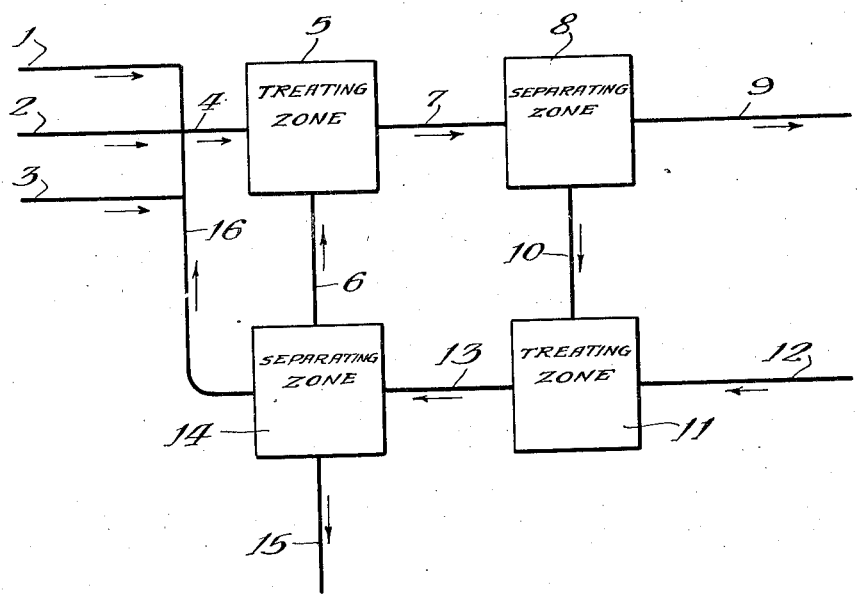
Inventors
Carl B. Linn
Julian M. Mavity
By: Maynard R. Venema
Attorney Patented Mar. 30, 1948

2,438,565

UNITED STATES PATENT OFFICE 2,438,565

METHOD OF PURIFYING A HYDROCARBON MATERIAL CONTAINING A RELATIVELY SMALL AMOUNT OF AN ORGANIC FLUORINE COMPOUND

Carl B. Linn, Riverside, and Julian M. Mavity, Hinsdale, Ill., assignors to Universal Oil Products Company, Chicago, Ill., a corporation of Delaware Application October 26, 1945, Serial No. 624,768

12 Claims. (Cl. 260—676)

This invention relates to a process for treating a hydrocarbon or hydrocarbon mixture which is contaminated by small amounts of organic fluorine compounds to remove fluoride therefrom. More specifically, it relates to the treatment of hydrocarbons produced synthetically in the presence of an active fluoride catalyst to remove small amounts of organically combined fluorine present in compounds admixed with the hydrocarbon or hydrocarbon mixture.

The invention is particularly adapted to the treatment of hydrocarbons produced by the alkylation of isoparaffinic hydrocarbons with olefinic hydrocarbons or with alkyl fluorides using active fluoride catalysts including hydrogen fluoride or fluoride mixtures comprising essentially hydrogen fluoride and boron fluoride. The process is also applicable to the removal of alkyl fluorides from propane and butane fractions, said fractions being recovered from the gaseous products discharged from an alkylation plant in which isobutane is alkylated by olefins present in a propane-propylene or butane-butylene fraction.

An object of this invention is to defluorinate a hydrocarbon or hydrocarbon mixture contaminated by relatively small amounts of organic fluorine compounds, particularly alkyl fluorides.

Another object of this invention is to dehydrofluorinate an isoparaffin alkylation product formed in the presence of an active fluoride catalyst.

A further object of this invention is to remove alkyl fluorides from hydrocarbon conversion products formed in the presence of an active fluoride catalyst.

A still further object of this invention is to remove alkyl fluorides from a fraction of normally gaseous paraffinic hydrocarbons recovered from the products formed in the alkylation of isobutane by olefins present in a $C_3$–$C_4$ hydrocarbon fraction.

Another object of this invention is to remove ethyl fluoride from a propane fraction recovered from the products formed in the alkylation of isobutane in the presence of hydrogen fluoride with a propane-propylene fraction containing a relatively small amount of ethylene.

One specific embodiment of the present invention comprises a process for treating hydrocarbon material containing as an impurity a relatively small percentage of organically combined fluorine to remove fluorine therefrom which comprises contacting said material with sulfur trioxide at defluorinating conditions of temperature and pressure, and recovering the treated hydrocarbon material.

A further embodiment of the present invention comprises a process for treating hydrocarbon material containing as an impurity a relatively small percentage of organically combined fluorine to remove fluorine therefrom which comprises contacting said material with hydrogen fluoride and sulfur trioxide at dehydrofluorinating conditions of temperature and pressure, and recovering the treated hydrocarbon material.

Another embodiment of the present invention comprises a process for treating hydrocarbons recovered from an alkylation process in which an isoparaffin is alkylated with an olefin in the presence of an active fluoride catalyst, by treating said hydrocarbons in the presence of sulfur trioxide and hydrogen fluoride at dehydrofluorinating conditions of temperature, pressure and time, and recovering the treated hydrocarbons.

The alkylation of branched chain paraffinic hydrocarbons such as isobutane and isopentane with olefinic hydrocarbons, particularly the olefinic hydrocarbons present in cracked gases, produces saturated liquid hydrocarbons utilizable as constituents of gasoline of high antiknock value. By this means relatively low boiling isoparaffinic hydrocarbons are alkylated with low boiling olefins and thereby converted into materials of higher boiling point and high antiknock values. The higher boiling hydrocarbons so formed from low boiling isoparaffins and olefins in the presence of an active fluoride catalyst including hydrogen fluoride or mixtures of hydrogen fluoride and boron fluoride, frequently contain small amounts of organic fluorine compounds which are not readily removable by washing with caustic and water or by fractional distillation.

These contaminating fluorine compounds which are thus present in alkylation hydrocarbon mixtures are frequently due to the interaction of hydrogen fluoride with olefins to form alkyl fluorides. Some alkyl fluorides are more stable than others in the presence of active fluoride catalysts. Thus, ethyl fluoride is more stable than some of the higher molecular weight alkyl fluorides in an alkylation reaction mixture and is not converted completely into paraffinic alkylation products but admixes with the hydrocarbon products. Some higher boiling alkyl fluorides and other organic fluorine compounds may also remain in hydrocarbon alkylation products. Because of its high stability, boiling point, and the fact that it forms with propane an azeotrope boiling at −47° C., ethyl fluoride is found in the propane fraction recovered from an alkylation process utilizing a propane-propylene fraction as an olefinic charging stock. Such propane-propylene charging stocks frequently contain ethylene in small amounts and ethyl fluoride forms by the addition of hydrogen fluoride to this olefin of lowest molecular weight.

Boron fluoride assists hydrogen fluoride in catalyzing the alkylation of an isoparaffin by ethylene and higher olefins, but in these cases the alkylation product also contains small quantities of organic fluorides as do those formed in the presence of hydrogen fluoride from an isoparaffin and an olefin of higher molecular weight than ethylene.

Although the fluorine content of the hydrocarbon product of gasoline boiling range resulting from an alkylation treatment is rarely very high, the presence of fluorine is undesirable both from the standpoint that the combustion products of such a fuel are corrosive, as well as the fact that the antiknock value of the gasoline, generally expressed by the term "octane number" is reduced considerably either when the gasoline is used as such, or when a small amount of an antidetonating agent such as lead tetraethyl is added thereto. Thus it may be shown that gasoline fractions containing 0.1% by weight of fluorine have inferior antiknock properties, particularly as concerns their response to lead tetraethyl, as compared to the otherwise same material which contains substantially no fluorine compounds. The present invention offers a method for reducing the fluorine content of the hydrocarbon alkylation product to an amount where this adverse effect is negligible.

Also, propane and normal butane which are not alkylated during the alkylation treatment of an isoparaffin with olefins present in a $C_3$ or a $C_4$ hydrocarbon fraction are recovered from alkylation products and marketed as bottled gas for use as domestic fuels and for various industrial uses. Such recovered propane and normal butane fractions are sometimes contaminated by ethyl fluoride and other organic fluorine compounds formed incidentally in the alkylation treatment and it is desirable that these propane and butane fractions be freed from fluorine compounds before being so utilized as fuel.

It is much more difficult to dehydrofluorinate ethyl fluoride than the other alkyl fluorides which may be encountered in products of the hydrogen fluoride alkylation process. It has been observed that alkylation plants which charge a propane-propylene feed stock to the alkylation reactor produce ethyl fluoride from the ethylene which sometimes contaminates the $C_3$ feed stock. This ethyl fluoride tends to go through the plant unchanged and finally appears in the propane fraction recovered from the effluent gases. The methods used heretofore for removing organic fluorine compounds from alkylate such as passage through heated contactors containing bauxite or aluminum do not cause the dehydrofluorination of ethyl fluoride and consequently are ineffective for producing a propane fraction substantially free from fluorine. Our process, however, does defluorinate not only the gasoline boiling range material but also propane and butane and makes it possible to produce substantially fluorine-free propane and butane fractions.

As indicated above, ethyl fluoride is more stable than the higher alkyl fluorides encountered in the products of the hydrogen fluoride alkylation process. Possibly one reason for this difference in stability of the alkyl fluorides is the fact that ethyl fluoride is a primary alkyl fluoride, while the alkyl fluorides produced from propylene and higher olefins are either secondary or tertiary alkyl fluorides. We have found that when propane which is contaminated by small amounts of ethyl fluoride is treated with sulfur trioxide and hydrogen fluoride at about 25° C., the fluorine content is reduced more than 90%. For convenience, the sulfur trioxide used may be in the form of fuming sulfuric acid which is a solution of sulfur trioxide in concentrated sulfuric acid. These results are remarkable and unpredictable because neither hydrogen fluoride nor sulfuric acid nor a mixture of hydrogen fluoride and sulfuric acid would defluorinate to anything near this extent, that is, hydrogen fluoride or sulfuric acid alone removed about 20% of ethyl fluoride from a propane fraction, while a mixture of sulfuric acid and hydrogen fluoride removed about 40% of the fluoride but a mixture of hydrogen fluoride and fuming sulfuric acid removed 96% of the fluorine from propane containing dissolved ethyl fluoride.

According to the process of the present invention, hydrocarbon material contaminated by organic fluorine compounds is freed from a substantial proportion of such organically combined fluorine by treatment with sulfur trioxide, preferably in the presence of at least an equal molecular proportion of hydrogen fluoride. Since sulfur trioxide is an unstable solid which melts at about 16° C., but changes to another form with much higher melting point, it is preferable to employ a solution of this material in a suitable solvent as a defluorinating agent in the process of our invention. The defluorination process is carried out at a temperature of from about −50° to about 80° C. and preferably at a temperature of from about 0° to about 40° C. at atmospheric pressure or at a superatmospheric pressure sufficient to maintain the fluorine-containing hydrocarbon or hydrocarbon mixture and treating agent in substantially liquid phase.

Suitable solvents for sulfur trioxide include liquid sulfur dioxide, sulfuric acid, etc.

The treatment of a hydrocarbon or hydrocarbon mixture with sulfur trioxide is effected in either batch or continuous types of treatment. In batch type operation, one volume of the hydrocarbon or hydrocarbon mixture contaminated by organic fluorine compounds is agitated with from about 0.1 to about 2 volumes of a sulfur trioxide-containing reagent comprising sulfur trioxide dissolved in a solvent such as concentrated sulfuric acid, or liquid sulfur dioxide and preferably in the presence of hydrogen fluoride. This treatment at a temperature of from about −50° to about 150° C. and at a pressure sufficient to maintain liquid phase operation is generally continued for a time of from 0.1 to about 3 hours after which the reaction mixture is separated into a hydrocarbon layer and a lower layer, the latter comprising hydrogen fluoride and the solvent for sulfur trioxide. The recovered sulfur trioxide and hydrogen fluoride may be recycled to further use in the process while the hydrocarbon layer is washed, dried, and distilled.

Continuous treatment of a hydrocarbon containing organically combined fluorine is effected by passing said hydrocarbon and proportioned amounts of sulfur trioxide and a solvent for sulfur trioxide through a baffled mixer or other suitable type of contacting equipment in which the hydrocarbon and mixture of hydrogen fluoride and sulfur trioxide are contacted at the aforementioned conditions of temperature and pressure for a time sufficient to remove substantially all of the fluorine from the hydrocarbon material. From this treating equipment the mixture of hydrocarbon material, hydrogen fluoride, sulfur trioxide, and solvent for said sulfur trioxide is directed to a separator from which the hydrocarbon layer is removed and then washed, dried, and distilled or otherwise treated to recover the desired hydrocarbons substantially free from fluorine-containing compounds. The used solution comprising hydrogen fluoride, sulfur trioxide, and solvent for sulfur trioxide is withdrawn from the separator and a portion is recycled to further use in treating an additional quantity of the mentioned charging stock.

In order to illustrate further the process of our invention, the attached diagrammatic drawing is given to indicate one arrangement of equipment that may be utilized in effecting the defluorination of, for example, a propane fraction containing ethyl fluoride and recovered from a process in which an isoparaffin is alkylated with a propane-propylene fraction containing small amounts of ethylene.

By means not illustrated in the drawing, hydrogen fluoride, sulfur dioxide, and sulfur trioxide are introduced through lines 1, 2, and 3 and line 4 to treating reactor 5 in which a stream of partially treated hydrocarbons, hereinafter described, is introduced to treating zone 5 through line 6. A sufficient proportion of sulfur trioxide is used to effect the desired degree of defluorination in zone 5 and then the reaction mixture is conducted through line 7 to separating zone 8 where the defluorinated hydrocarbon is removed through line 9. To utilize more effectively the partially spent defluorination reagent, it is taken from zone 8 through line 10 to treating zone 11 wherein it is contacted with a fresh stream of hydrocarbon entering through line 12. From treating zone 11 the reaction mixture is directed through line 13 to separating zone 14 where the partially treated hydrocarbon mixture is removed through line 6 as aforementioned, the solvent such as sulfur dioxide which is separated in zone 14 is directed therefrom through line 16 to line 4 wherein it is contacted with the stream of fresh hydrocarbon mixture, while waste products are discharged from separating zone 14 through line 15.

One suitable method for introducing controlled amounts of sulfur trioxide to zone 5 comprises passing a stream of liquid sulfur dioxide through a contactor containing sulfur trioxide under such conditions that the outgoing sulfur dioxide stream contains sulfur trioxide in suspension and/or solution.

Instead of commingling hydrogen fluoride with a solution of sulfur trioxide in liquid sulfur dioxide before contacting with the hydrocarbon material contaminated by organic fluorine compounds, the hydrogen fluoride may be introduced advantageously in solution in the hydrocarbon material itself since about 1% of hydrogen fluoride is soluble in such hydrocarbon material.

Also, while the presence of hydrogen fluoride is generally desirable in order to effect a high degree of defluorination, it is not always necessary to have hydrogen fluoride present since an alkyl fluoride which is dissolved in a hydrocarbon fraction may be removed therefrom by reaction with sulfur trioxide in a manner illustrated by the following equation:

$$SO_3 + RF \rightarrow FSO_2OR$$

in which R is an alkyl radical having at least 2 carbon atoms.

While we prefer to employ sulfur dioxide as a solvent for sulfur trioxide in the process of our invention, sulfur trioxide may also be utilized in the form of a solution in another liquid in which it is soluble. Such solvents include particularly concentrated sulfuric acid.

The following example is given to show results obtained in the operation of our process, but it is not to be considered as limiting unduly the broad scope of the invention.

A run was made in which 50 grams of a propane fraction containing 1% by weight of fluorine present as ethyl fluoride was contacted at 25° C. for 3 hours in a rotatable steel autoclave of 850 cc. capacity with 62 grams of anhydrous hydrogen fluoride and 96 grams of fuming sulfuric acid (30% $SO_3$). Other portions of the same propane-ethyl fluoride mixture were treated similarly with hydrogen fluoride and with sulfuric acid. The results obtained in these different runs are as follows:

| Treating Agent | Defluorination |
|---|---|
| | Per cent |
| Hydrogen fluoride and fuming sulfuric acid (30% $SO_3$) | 96 |
| Hydrogen fluoride | 21 |
| Concentrated sulfuric acid | 19 |
| Hydrogen fluoride and concentrated sulfuric acid | 43 |

The above results show the high degree of defluorination effected in the presence of both hydrogen fluoride and a solution of sulfur trioxide in concentrated sulfuric acid.

The nature of the present invention and type of results obtained in the process are evident from the preceding specification and example, although neither section should be construed to limit unduly the broad scope of the invention.

We claim as our invention:

1. A process for treating a hydrocarbon material containing as an impurity a relatively small percentage of organically combined fluorine to remove fluorine therefrom which comprises contacting said hydrocarbon material with sulfur trioxide at defluorinating conditions of temperature and pressure such as to maintain the sulfur trioxide in liquid phase, and recovering the treated hydrocarbon material.

2. A process for treating a hydrocarbon material containing as an impurity a relatively small percentage of organically combined fluorine to remove fluorine therefrom which comprises contacting said hydrocarbon material with sulfur trioxide at a temperature of from about —50° to about 80° C. and a pressure sufficient to maintain the sulfur trioxide in liquid phase, and recovering the treated hydrocarbon material.

3. A process for treating a propane fraction containing ethyl fluoride as an impurity to remove fluorine therefrom which comprises contacting said propane fraction with sulfur trioxide at a temperature of from about —50° to about 80° C. and a pressure sufficient to maintain the sulfur trioxide in liquid phase, and recovering the treated propane fraction.

4. A process for treating a hydrocarbon material containing as an impurity a relatively small percentage of organically combined fluorine to remove fluorine therefrom which comprises contacting said hydrocarbon material with a solution of sulfur trioxide in sulfur dioxide at defluorinating conditions of temperature and pressure such as to maintain said solution in liquid phase, and recovering the treated hydrocarbon material.

5. A process for treating a hydrocarbon material containing as an impurity a relatively small percentage of organically combined fluorine to remove fluorine therefrom which comprises contacting said hydrocarbon material with a solution of sulfur trioxide in sulfur dioxide at a temperature of from about −50° to about 80° C. and at a pressure sufficient to maintain substantially liquid phase operation, and recovering the treated hydrocarbon material.

6. A process for treating a hydrocarbon material containing as an impurity a relatively small percentage of organically combined fluorine to remove fluorine therefrom which comprises contacting said hydrocarbon material simultaneously with sulfur trioxide and hydrogen fluoride at defluorinating conditions of temperature and pressure such as to maintain the sulfur trioxide and hydrogen fluoride in liquid phase, and recovering the treated hydrocarbon material.

7. A process for treating a hydrocarbon material containing as an impurity a relatively small percentage of organically combined fluorine to remove fluorine therefrom which comprises contacting said hydrocarbon material simultaneously with sulfur trioxide and hydrogen fluoride at a temperature of from about −50° to about 80° C. and a pressure sufficient to maintain the sulfur trioxide and hydrogen fluoride in liquid phase, and recovering the treated hydrocarbon material.

8. A process for treating a hydrocarbon material containing as an impurity a relatively small percentage of organically combined fluorine to remove fluorine therefrom which comprises contacting said hydrocarbon material simultaneously with hydrogen fluoride and a solution of sulfur trioxide in sulfur dioxide at defluorinating conditions of temperature and pressure such as to maintain the hydrogen fluoride and said solution in liquid phase, and recovering the treated hydrocarbon material.

9. A process for treating a propane fraction containing as an impurity a relatively small percentage of an alkyl fluoride to remove fluorine therefrom which comprises contacting said propane fraction simultaneously with hydrogen fluoride and a solution of sulfur trioxide in sulfur dioxide at a temperature of from about −50° to about 80° C. and at a pressure sufficient to maintain substantially liquid phase operation, and recovering the treated propane fraction.

10. A method of purifying a hydrocarbon material containing a relatively small amount of an organic fluorine compound which comprises treating the hydrocarbon material at defluorinating conditions with a solution of sulfur trioxide in a solvent selected from the group consisting of liquid sulfur dioxide and sulfuric acid.

11. A method of purifying a hydrocarbon material containing a relatively small amount of an organic fluorine compound which comprises treating the hydrocarbon material at defluorinating conditions with a solution of sulfur trioxide in sulfuric acid.

12. A method of purifying a hydrocarbon material containing a relatively small amount of an organic fluorine compound which comprises treating the hydrocarbon material at defluorinating conditions with a defluorinating agent comprising fuming sulfuric acid and hydrogen fluoride.

CARL B. LINN.
JULIAN M. MAVITY.

REFERENCES CITED

The following references are of record in the file of this patent:

UNITED STATES PATENTS

| Number | Name | Date |
|---|---|---|
| 2,143,493 | Stanley | Jan. 10, 1939 |
| 2,320,629 | Matuszak | June 1, 1943 |
| 2,378,762 | Frey | June 19, 1945 |

OTHER REFERENCES

J. A. C. S. 58: 882–4 (June, 1936), 3 pages. (Copy in Division 31.)